US010402280B2

(12) United States Patent
Chen et al.

(10) Patent No.: US 10,402,280 B2
(45) Date of Patent: Sep. 3, 2019

(54) FILE TRANSFER SYSTEM AND METHOD, POLICY SERVER, TERMINAL AND STORAGE MEDIUM (71) Applicant: Tencent Technology (Shenzhen) Company Limited, Shenzhen (CN)

(72) Inventors: Zhixing Chen, Shenzhen (CN); Wentao Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 1055 days.

(21) Appl. No.: 14/826,504

(22) Filed: Aug. 14, 2015

(65) Prior Publication Data
US 2015/0347241 A1    Dec. 3, 2015

Related U.S. Application Data (63) Continuation of application No. PCT/CN2013/087535, filed on Nov. 20, 2013.

(30) Foreign Application Priority Data

Feb. 27, 2013   (CN) .......................... 2013 1 0061914

(51) Int. Cl.
*G06F 11/00*    (2006.01)
*G06F 11/14*    (2006.01)
(Continued)

(52) U.S. Cl.
CPC ...... *G06F 11/1464* (2013.01); *G06F 11/1461* (2013.01); *G06F 16/148* (2019.01);
(Continued)

(58) Field of Classification Search
CPC ............. G06F 11/1464; G06F 11/1461; G06F 16/148; G06F 16/183; G06F 2201/84; H04L 67/06; H04L 67/1097
(Continued)

(56) References Cited

U.S. PATENT DOCUMENTS 6,006,263 A * 12/1999 Horwitz .................. H04L 29/06
709/225
2011/0154213 A1* 6/2011 Wheatley .............. G06F 3/0481
715/738
2012/0278424 A1* 11/2012 Zohar ................. H04L 67/2852
709/213

FOREIGN PATENT DOCUMENTS

CN       1791239 A    6/2006
CN     101014022 A    8/2007
(Continued)

OTHER PUBLICATIONS

Tencent Technology, ISRWO, PCT/CN2013/087535, dated Feb. 27, 2014, 22 pgs.
(Continued)

*Primary Examiner* — Vincent F Boccio
(74) *Attorney, Agent, or Firm* — Morgan, Lewis & Bockius LLP (57) ABSTRACT The present application discloses a file transfer system, a policy server, a terminal, and a file transfer method. The file transfer system includes a file sending terminal, a file receiving terminal, the policy server, and a file server. The file sending terminal is configured to acquire and report a unique identifier of a file to be transferred to the file receiving terminal; the policy server is configured to query, according to the unique identifier, whether the file server stores a backup file same as the file to be transferred; and when the file server stores the backup file, the policy server is further configured to indicate transfer of the backup file
(Continued)

from the file server to the file receiving terminal. The present application enables a file receiving terminal to acquire a file to be transferred at a transfer speed corresponding to a downlink bandwidth of the file receiving terminal, so as to accelerate a process of file transfer between terminals.

11 Claims, 5 Drawing Sheets

(51) Int. Cl.
    *H04L 29/08*     (2006.01)
    *G06F 16/14*     (2019.01)
    *G06F 16/182*     (2019.01)

(52) U.S. Cl.
    CPC ............ *G06F 16/183* (2019.01); *H04L 67/06* (2013.01); *H04L 67/1097* (2013.01); *G06F 2201/84* (2013.01)

(58) Field of Classification Search
    USPC ........................................................ 707/654
    See application file for complete search history.

(56) References Cited

FOREIGN PATENT DOCUMENTS

| | | |
|---|---|---|
| CN | 101350790 A | 1/2009 |
| CN | 101146130 B | 2/2012 |
| EP | 1763187 A1 | 3/2007 |

OTHER PUBLICATIONS

Tencent Technology, IPRP, PCT/CN2013/087535, dated Sep. 1, 2015, 9 pgs.

\* cited by examiner

FILE TRANSFER SYSTEM AND METHOD, POLICY SERVER, TERMINAL AND STORAGE MEDIUM

RELATED APPLICATION

This patent application is a continuation application of PCT Patent Application No. PCT/CN2013/087535, entitled "FILE TRANSFER SYSTEM, POLICY SERVER, TERMINAL, AND FILE TRANSFER METHOD" filed on Nov. 20, 2013, which claims priority to Chinese Patent Application No. 201310061914.4, entitled "FILE TRANSFER SYSTEM, POLICY SERVER, TERMINAL, AND FILE TRANSFER METHOD" filed on Feb. 27, 2013, both of which are incorporated by reference in their entirety.

FIELD OF THE TECHNOLOGY

The present application relates to computer network communications technologies, and in particular, to a file transfer system and method, a policy server, a terminal, and a storage medium.

BACKGROUND OF THE DISCLOSURE

With the remarkable progress of Internet technologies and the rapid development of Internet services, the needs of establishing a network connection by using an instant messenger (IM) tool and transferring a file directly from one terminal to another terminal become increasingly popular.

Figure 1:
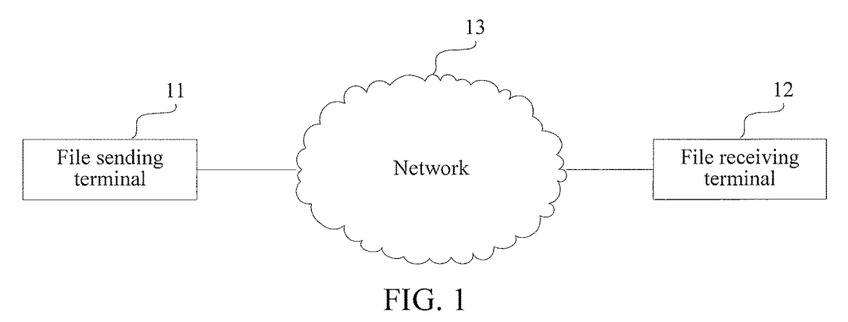
FIG. 1 is a schematic diagram of an existing file transfer system.

FIG. 1 is a schematic diagram of an existing file transfer system. As shown in FIG. 1, the file transfer system includes a file sending terminal 11 and a file receiving terminal 12, both being connected to a network 13. The file sending terminal 11 may request, by using a handshake protocol, to establish a persistent connection to the file receiving terminal 12. The file sending terminal 11 may continuously read content of a file to be transferred, and then after the persistent connection is established successfully, send the read content of the file to the file receiving terminal 12 over the persistent connection. The file receiving terminal 12 creates a file and continuously writes the received content of the file in the created file. The entire process is repeated over and over again till the entire process of file transfer is completed. The persistent connection refers to one network connection over which multiple data packets can be continuously sent and in which both parties need to send a link detection packet if no data packet is sent while the connection is kept.

However, in current network access technologies, an asymmetric digital transmission technology, for example, an Asymmetric Digital Subscriber Line (ADSL) or a similar network technology is generally used. Such a technology is characterized in that an uplink bandwidth and a downlink bandwidth are asymmetric. On a network connection based on an asymmetric digital transmission technology, an uplink maximum transfer rate is much lower than a downlink maximum transfer rate. For example, on generally involved 1 M, 2 M, and 10 M ADSL broadband network connections, these 1 M, 2 M, and 10 M bandwidths are all downlink bandwidths. A maximum download speed of the 1 M bandwidth is about 128 kb/s, and a maximum download speed of the 2 M bandwidth is about 256 kb/s. However, a maximum upload speed of the 1 M bandwidth is 64 kb/s, and hardly exceeds 50 kb/s on an actual network connection. A transfer process of the file transfer system in FIG. 1 is used as an example, in which a file to be transferred by the file sending terminal is 1.0 GB, a network uplink rate of the file sending terminal is 50 kb/s, and a network downlink speed of the file receiving terminal is 256 kb/s. If the entire network of the file sending terminal is occupied to transfer the file, time to be consumed by the entire transfer process is about 349 minutes, which is mainly restricted by the uplink speed of the file sending terminal. Therefore, in an existing process of file transfer, an uplink transfer rate of a file sending terminal becomes a bottleneck of file transfer, causing that a current file transfer speed is restricted by an uplink bandwidth of a terminal, and the transfer speed is low.

SUMMARY

Embodiments provide a file transfer system and method, a policy server, a terminal, and a storage medium, which overcome restrictions caused by an uplink transfer rate of a current network, and achieve acceleration of a process of file transfer between terminals.

According to a first aspect, this embodiment discloses a file transfer system, including a file sending terminal, a file receiving terminal, a policy server, and a file server, wherein:

the file sending terminal is configured to acquire and report a unique identifier of a file to be transferred to the file receiving terminal;

the policy server is configured to query, according to the unique identifier, whether the file server stores a backup file same as the file to be transferred;

when the file server stores the backup file, the policy server is further configured to indicate transfer of the backup file from the file server to the file receiving terminal by acquiring location information of the backup file and delivering the location information to the file receiving terminal and the file receiving terminal is specifically configured to download the backup file from the file server according to the location information and instruct the file sending terminal to stop transfer of the file to be transferred after the location information of the backup file is received; and when the file server does not store the backup file, the policy server is further configured to indicate transfer of the file to be transferred from the file sending terminal to the file receiving terminal and the file sending terminal is further configured to transfer the file to be transferred from the file sending terminal to the file receiving terminal.

According to a second aspect, this embodiment further discloses a policy server comprising one or more processors, memory, and a plurality of program units stored in the memory and to be executed by the one or more processors, the plurality of program units further including:

a unique identifier receiving unit, configured to receive a unique identifier, reported by a file sending terminal, of a file to be transferred to a file receiving terminal;

a backup file query unit, configured to query, according to the unique identifier, whether a file server stores a backup file same as the file to be transferred; and a backup file transfer indication unit, configured to indicate transfer of the backup file from the file server to the file receiving terminal when the file server stores the backup file.

According to a third aspect, this embodiment further discloses a file transfer method performed by a file transfer system including a file sending terminal, a file receiving terminal, a policy server, and a file server, the method including:

acquiring and reporting, by the file sending terminal, a unique identifier of a file to be transferred to the file receiving terminal;

querying, by the policy server according to the unique identifier, whether the file server stores a backup file same as the file to be transferred;

when the file server stores the backup file:
indicating, by the policy server, transfer of the backup file from the file server to the file receiving terminal by acquiring location information of the backup file and delivering the location information to the file receiving terminal;
downloading, by the file receiving terminal, the backup file from the file server according to the location information and instructing, by the file receiving terminal, the file sending terminal to stop transfer of the file to be transferred after the location information of the backup file is received; and when the file server does not store the backup file:
indicating, by the policy server, transfer of the file to be transferred from the file sending terminal to the file receiving terminal; and
transferring, by the file sending terminal, the file to be transferred from the file sending terminal to the file receiving terminal.

In the file transfer system and method, the policy server, the terminal, and the storage medium according to the embodiments of the present application, when a file is transferred between terminals, a policy server queries whether a backup file same as a file to be transferred exists in a file server storing files, and when the same backup file exists, the backup file is directly sent from the file server to a file receiving terminal, so that the file receiving terminal can acquire the file to be transferred at a transfer speed corresponding to a downlink bandwidth of the file receiving terminal, and a process of file transfer is not restricted by an uplink bandwidth of a sending terminal, so as to accelerate the process of file transfer between the terminals.

DESCRIPTION OF EMBODIMENTS

The following further clearly describes the technical solutions in the embodiments of the present application in detail with reference to the accompanying drawings. Apparently, the described embodiments are merely a part rather than all of the embodiments of the present application, and are intended to explain principles of the present application instead of limiting the present application to the specific embodiments. All other embodiments obtained by a person of ordinary skill in the art based on the embodiments of the present application without creative efforts shall fall within the protection scope of the present application.

Figure 2:
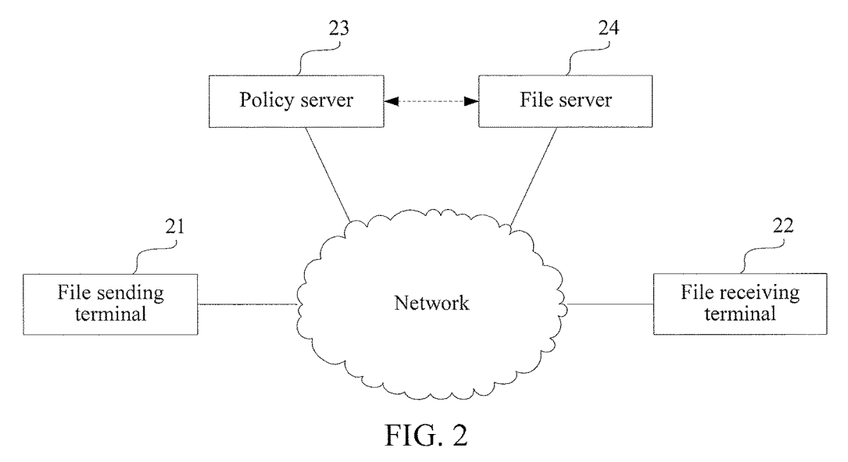
FIG. 2 is a schematic diagram of a file transfer system according to an embodiment of the present application.

FIG. 2 is a schematic diagram of a file transfer system according to an embodiment of the present application. As shown in FIG. 2, a file transfer system 20 includes a file sending terminal 21, a file receiving terminal 22, a policy server 23, and a file server 24. The file sending terminal 21 and the file receiving terminal 22 are connected to a network and establish a connection through the network to perform file transfer. Meanwhile, the file sending terminal 21 and the file receiving terminal 22 may also perform communication with the policy server 23 and the file server 24 through the network. The policy server 23 and the file server 24 may perform communication through the network or by using a direct data connection.

The file sending terminal 21 is configured to acquire and report a unique identifier of a file to be transferred to the file receiving terminal.

The policy server 23 is configured to query, according to the unique identifier, whether the file server stores a backup file same as the file to be transferred.

When the file server 24 stores the backup file, the policy server 23 is further configured to indicate transfer of the backup file from the file server 24 to the file receiving terminal 22.

The unique identifier may be obtained through calculation by the file sending terminal 21 according to the file to be transferred.

In an embodiment, the policy server 23 may be configured to acquire a transfer state of the file to be transferred, and query, according to the unique identifier, whether a server system stores the backup file same as the file to be transferred when the transfer state is worse than a predetermined condition. The server system may be the file server, and the transfer state of the file may include a steady speed of file transfer and/or estimated file transfer time.

In another embodiment, when the file server 24 stores the backup file, the policy server 23 may be configured to acquire location information of the backup file and deliver the location information to the file receiving terminal 22; and the file receiving terminal 22 is configured to download the backup file from the file server 24 according to the location information.

Moreover, the file receiving terminal 22 is configured to instruct the file sending terminal 21 to stop transfer of the file to be transferred after the location information of the backup file is received.

In the foregoing embodiments, the file sending terminal 21 and the file receiving terminal 22 may be any terminal device that can be connected to a network to perform file transfer, for example, a personal computer, a portable computer, a tablet computer, an intelligent mobile terminal or another similar device.

In different implementation manners of this embodiment, the policy server 23 and the file server 24 may be set as two independent servers, may also be set as two independent server clusters, or may further be two independent parts deployed on a same server cluster or independent parts deployed on a same server. The policy server 23 and the file server 24 may perform communication through the network or by using a direct data connection (for example, a communication bus shown by the dotted line in FIG. 2) according to different deployment forms.

Figure 3:
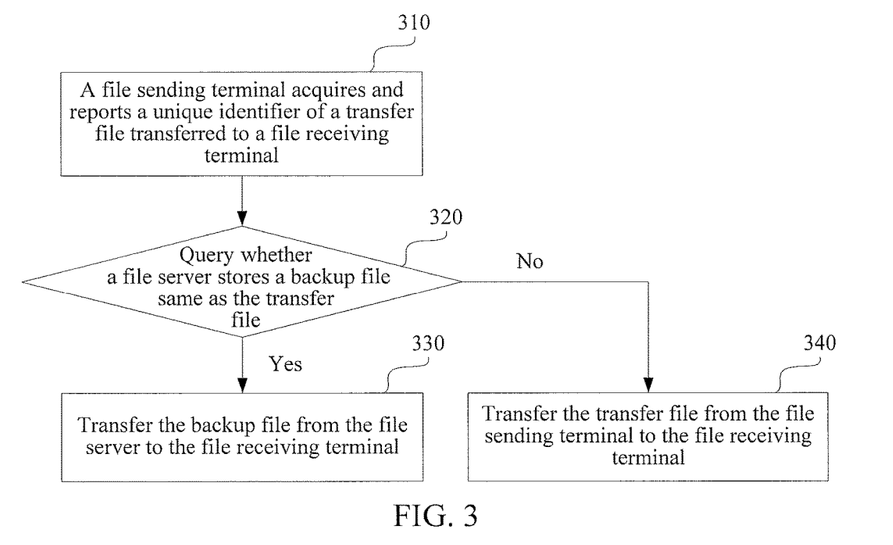
FIG. 3 is a flowchart of file transfer performed by a file transfer system according to an embodiment of the present application.

FIG. 3 is a flowchart of file transfer performed by a file transfer system according to an embodiment of the present application. As shown in FIG. 3, a process of file transfer includes:

Step 310: A file sending terminal 21 acquires and reports a unique identifier of a file to be transferred to a file receiving terminal 22, where the unique identifier may be obtained through calculation by the file sending terminal according to the file to be transferred.

The unique identifier is used for uniquely representing a content feature of the file to be transferred, so as to facilitate query to obtain a file copy whose content is identical to the file to be transferred. In a preferred implementation manner of this embodiment, the unique identifier may be obtained through calculation, by using a Secure Hash Algorithm-1 (SHA1), a Message Digest Algorithm-5 (MD5) or an MD5 algorithm based on first 10 M content of a file (10MMD5), based on a file to be transferred.

Step 320: A policy server 23 queries, according to the unique identifier, whether a file server 24 stores a backup file same as the file to be transferred, and performs step 330 if the backup file exists, or performs step 340 if the backup file does not exist.

In this embodiment, the backup file refers to a file whose content of the file is identical to that of the file to be transferred, which actually is a copy of the file to be transferred. Because the content of the file is identical, the backup file and the file to be transferred have the same unique identifier.

Step 330: When the file server 24 stores the backup file, the policy server 23 indicates transfer of the backup file from the file server 24 to the file receiving terminal 22.

Step 340: When the file server 24 does not store the backup file, transfer the file to be transferred from the file sending terminal 21 to the file receiving terminal 22.

In an embodiment, the step of querying, by a policy server 23 according to the unique identifier, whether a file server 24 stores a backup file same as the file to be transferred in step 320 includes:
(1) acquiring a transfer state of the file to be transferred;
(2) determining whether the transfer state is worse than a predetermined condition; and
(3) querying, according to the unique identifier, whether a server system stores the backup file same as the file to be transferred when the transfer state is worse than the predetermined condition, where the server system may be the file server 24.

The transfer state of the file may include a steady speed of file transfer and/or estimated file transfer time.

In another embodiment, the indicating, by the policy server 23, transfer of the backup file from the file server 24 to the file receiving terminal 22 when the file server 24 stores the backup file in step 330 includes:
(1) acquiring, by the policy server 23, location information of the backup file;
(2) delivering the location information to the file receiving terminal 22; and
(3) downloading, by the file receiving terminal 22, the backup file from the file server 24 according to the location information.

In still another embodiment, after the policy server 23 indicates transfer of the backup file from the file server 24 to the file receiving terminal 22 in step 330, the file sending terminal 21 stops transfer of the file to be transferred.

Moreover, the file receiving terminal 22 instructs the file sending terminal 21 to stop transfer of the file to be transferred after the file receiving terminal 22 receives the location information.

Therefore, in the embodiment described above, when a file is transferred between terminals, a policy server queries whether a backup file same as a file to be transferred exists in a file server storing files; and when the same backup file exists, the backup file is directly sent from the file server to a file receiving terminal, so that the file receiving terminal can acquire the file to be transferred at a transfer speed corresponding to a downlink bandwidth of the file receiving terminal, so as to accelerate a process of file transfer between terminals. For example, a file to be transferred by the file sending terminal is 1.0 GB, a network uplink speed of the file sending terminal is 50 kb/s, and a network downlink speed of the file receiving terminal is 256 kb/s. The time consumed by step 310 is about 15 seconds, and the time consumed by step 320 is about 3 seconds. The time that the file receiving terminal receives the file is only about 67 minutes, which is about ⅕ of the existing 349 minutes.

Figure 4:
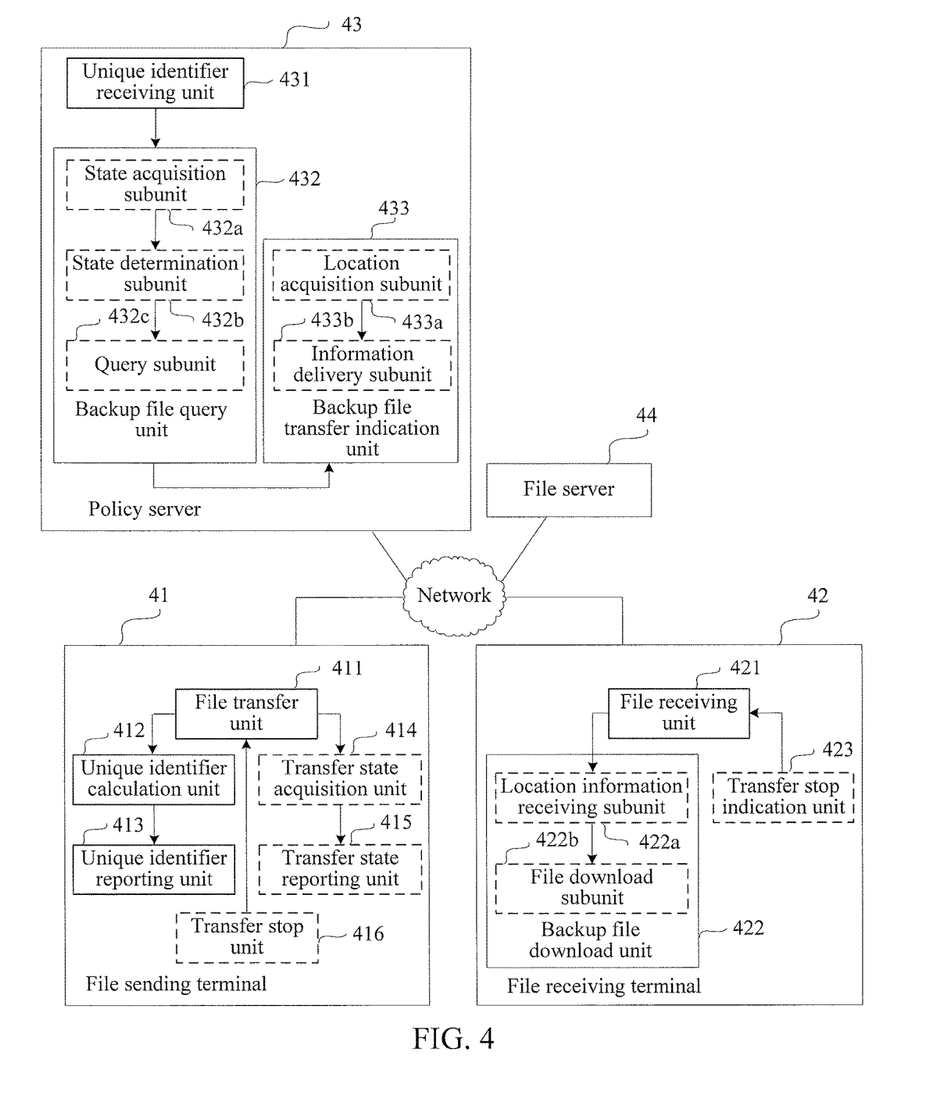
FIG. 4 is a schematic diagram of a file transfer system according to another embodiment of the present application.

FIG. 4 is a schematic diagram of a file transfer system according to another embodiment of the present application. As shown in FIG. 4, a file transfer system 40 includes a file sending terminal 41, a file receiving terminal 42, a policy server 43, and a file server 44. The file sending terminal 41 and the file receiving terminal 42 are connected to a network and establish a connection through the network to perform file transfer. Meanwhile, the file sending terminal 41 and the file receiving terminal 42 may also perform communication with the policy server 43 and the file server 44 through the network. The policy server 43 and the file server 44 may perform communication through the network or by using a direct data connection.

The file sending terminal 41 specifically includes one or more processors, memory and a plurality of program units, the plurality of program units further including:
a file transfer unit 411, configured to send a file to be transferred to the file receiving terminal 42;
a unique identifier calculation unit 412, configured to calculate a unique identifier of the file to be transferred according to the file to be transferred; and
a unique identifier reporting unit 413, corresponding to a unique identifier receiving unit 431 of the policy server 43, and configured to report the unique identifier to the policy server 43.

The file receiving terminal 42 specifically includes one or more processors, memory and a plurality of program units, the plurality of program units further including:
a file receiving unit 421, corresponding to the file transfer unit 411 of the file sending terminal 41, and configured to receive the file to be transferred from the file sending terminal 41; and
a backup file download unit 422, configured to download the backup file from the file server 44 according to an indication of the policy server 43.

The policy server 43 specifically includes one or more processors, memory and a plurality of program units, the plurality of program units further including:
the unique identifier receiving unit 431, corresponding to the unique identifier reporting unit 413 of the file sending terminal 41, and configured to receive the unique identifier, reported by the file sending terminal 41, of the file to be transferred to the file receiving terminal 42;
a backup file query unit 432, configured to query, according to the unique identifier, whether the file server 44 stores the backup file same as the file to be transferred; and
a backup file transfer indication unit 433, corresponding to the backup file download unit 422, and configured to indicate transfer of the backup file from the file server 44 to the file receiving terminal 42 when the file server 44 stores the backup file.

In a preferred implementation manner of this embodiment, the policy server 43 merely starts to the query for the backup file in a specific case. The backup file query unit 432 of the policy server 43 specifically includes (shown by the dotted line in FIG. 4):

a state acquisition subunit 432a, configured to acquire a transfer state of the file to be transferred over a network connection between the file sending terminal 41 and the file receiving terminal 42;

a state determination subunit 432b, configured to determine whether the transfer state is worse than a predetermined condition; and a query subunit 432c, configured to query, according to the unique identifier, whether a server system such as the file server 44 stores the backup file same as the file to be transferred when the transfer state is worse than the predetermined condition.

Correspondingly, the file sending terminal 41 further includes a transfer state acquisition unit 414 (shown by the dotted line in FIG. 4), configured to acquire the transfer state of the file to be transferred over the network connection between the file sending terminal 41 and the file receiving terminal 42, and a transfer state reporting unit 415 (shown by the dotted line in FIG. 4), configured to report the transfer state to the policy server 43. The transfer state of the file includes a steady speed of file transfer and/or estimated file transfer time.

The steady speed refers to a transfer speed after the transfer state of the file becomes steady.

The file sending terminal 41 may collect corresponding data after the transfer state becomes steady and perform estimation based on a parameter such as a size of the file to be transferred to obtain the transfer state of the file, and the file sending terminal 41 reports the transfer state of the file, together with the unique identifier of the file to be transferred, to the policy server 43.

A quick download mode is entered when the transfer state of the file between the terminals is poor to query whether the same backup file exists on a server side, so that an operation of the server side may be avoided when the file to be transferred is small and the transfer state is good, so as to prevent an operation/communication delay of the server side from extending transfer time of a small file, and also to reduce a burden of the server side and save resources of the server side.

Meanwhile, in the implementation manner, a manner of delivering location information of the backup file to the file receiving terminal 42 by using the policy server 43 is preferably used to instruct the file receiving terminal 42 to download the backup file. Therefore, the backup file transfer indication unit 433 of the policy server 43 includes:

a location acquisition subunit 433a (shown by the dotted line in FIG. 4), configured to acquire the location information of the backup file; and an information delivery subunit 433b (shown by the dotted line in FIG. 4), configured to deliver the location information to the file receiving terminal 42, so as to instruct the file receiving terminal 42 to download the backup file from the file server.

Correspondingly, the backup file download unit 422 of the file receiving terminal 42 includes:

a location information receiving subunit 422a (shown by the dotted line in FIG. 4), corresponding to the information delivery subunit 433b, and configured to acquire, from the policy server 43, location information of the backup file, same as the file to be transferred, on the file server 44; and a file download subunit 422b (shown by the dotted line in FIG. 4), configured to download the backup file from the file server 44 according to the location information.

In the foregoing preferred manner, the entire process of file transfer is coordinated by using the policy server 43 as an interaction node of the entire process without reforming the file server 44, and is easy to be implemented.

Certainly, a person skilled in the art may understand that another structure may be used for the policy server 43, the file server 44, and the file receiving terminal 42. Especially, when the file server 44 is reformed and a corresponding process is used to find the backup file in the file server 44, transfer of the backup file from the file server 44 to the file receiving terminal 42 is indicated. For example, after the backup file is found, the policy server 43 sends an identifier of the file receiving terminal 42 to the file server 44; the file server 44 actively delivers the location information of the backup file to the file receiving terminal 42; and the file receiving terminal 42 requests, according to the location information of the file, to the file server 44 to download the backup file. For example, the identifier of the file receiving terminal 42 may further be inserted in a query request sent to the file server 44; and after the backup file is found, the file server 44 actively pushes the backup file to the file receiving terminal 42, and if a user of the file receiving terminal 42 chooses to receive the push, the backup file starts to be transferred. The manner of sending the identifier of the file receiving terminal 42 to the file server 44 and the manner of transferring the backup file can be mixed or combined to form different solutions. Correspondingly, corresponding components can be configured for the policy server 43, the file server 44, and the file receiving terminal 42 to implement corresponding functions.

Figure 5:
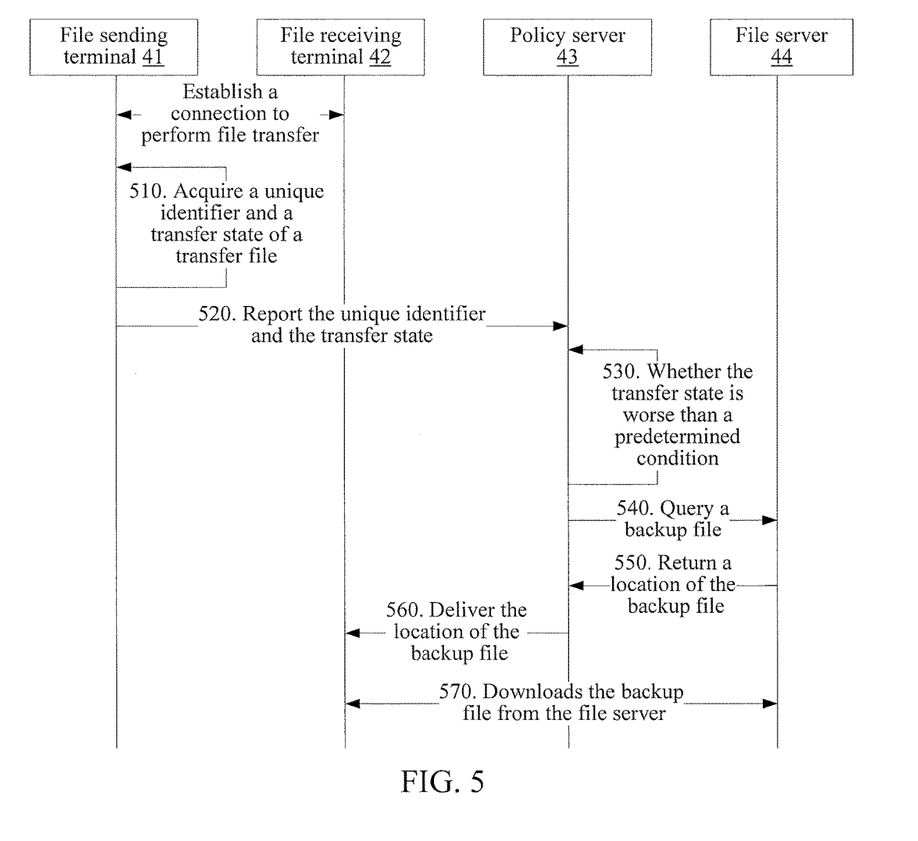
FIG. 5 is a flowchart of a preferred implementation manner according to another embodiment of the present application.

FIG. 5 is a flowchart of a preferred implementation manner according to another embodiment of the present application. As shown in FIG. 5, the process includes:

Step 510: A file sending terminal 41 calculates a unique identifier of a file to be transferred by using a unique identifier calculation unit 412, and acquires a transfer state by using a transfer state acquisition unit 414.

Specifically, the file sending terminal 41 actively detects whether a current file transfer speed tends to be steady (according to statistics of data, in a general case, the transfer speed may be considered to tend to be steady within 10 to 20 seconds after a file starts to be transferred), and after the transfer speed is steady, the file sending terminal 41 calculates the transfer state of the file (including a network connection type, a connection type of file transfer, a steady speed of the file transfer, estimated remaining time of file transfer, a size of the transferred file, and the like) during a current process of file transfer, and calculates the unique identifier according to the transferred file. Generally, the process consumes about 15 seconds.

Step 520: The file sending terminal 41 respectively reports the unique identifier and the transfer state to a unique identifier receiving unit 431 and a state acquisition subunit 432a of a policy server 43 by using a unique identifier reporting unit 413 and a transfer state reporting unit 415. Correspondingly, the policy server 43 respectively receives the unique identifier and transfer state information by using the unique identifier receiving unit 431 and the state acquisition subunit 432a.

Step 530: The policy server 43 determines whether the transfer state is worse than a predetermined condition by using a state determination subunit 432b. The predetermined condition is comprehensively determined by an access load that the policy server 43 can bear, an operation of a server side, and a communication delay.

For example, the policy server 43 determines whether the transfer state is worse than a predetermined condition where a transfer rate is less than 70 kb/s and remaining transfer time is longer than 60 seconds, and if the predetermined condition is satisfied, starts a quick transfer process, and performs step 540.

Certainly, the predetermined condition may also be merely set to that a transfer rate is less than 70 kb/s, or be merely set to that remaining transfer time is longer than predetermined time.

Step 540: The policy server 43 queries, according to the unique identifier by using a query subunit 432c, whether a file server 44 stores a backup file same as the file to be transferred.

Step 550: If it is found that the same backup file exists, the file server 44 returns a storage location of the backup file to a location acquisition subunit 433a of a backup file transfer indication unit 433 of the policy server 43.

Step 560: An information delivery subunit 433b of the backup file transfer indication unit 433 of the policy server 43 delivers the location information to a location information receiving subunit 422a of a file receiving terminal 42.

Step 570: A file download subunit 422b of the file receiving terminal 42 downloads the backup file from the file server 44 according to the location information.

In the preferred implementation manner, a quick download mode is entered when the transfer state of the file between the terminals is poor to query whether the same backup file exists on a server side, so that an operation of the server side may be avoided when the file to be transferred is small and the transfer state is good, so as to prevent an operation/communication delay of the server side from extending transfer time of a small file, and also to reduce a burden of the server side and save resources of the server side.

In another preferred implementation manner of this embodiment, the file receiving terminal 42 further includes a transfer stop instruction unit 423 (shown by the dotted line in FIG. 4), configured to instruct the file sending terminal 41 to stop transfer of the file to be transferred after the policy server 43 indicates transfer of the backup file form the file server 44 to the file receiving terminal 42. Specifically, the file receiving terminal 42 instructs the file sending terminal 41 to stop transfer of the file to be transferred after the location information, delivered by the policy server 43 or the file server 44, of the backup file is received.

Correspondingly, the file sending terminal 41 further includes a transfer stop unit 416, configured to stop transfer of the file to be transferred according to an indication of the file receiving terminal 42.

A network connection that has been established between a file receiving terminal and a file sending terminal is used to instruct, by using the file receiving terminal, the file sending terminal to stop transfer of a file to be transferred without establishing a new connection, so that a reaction speed is high, and network resources are saved.

Meanwhile, a person skilled in the art may understand that the file sending terminal may also be instructed in another manner to stop transfer of the file to be transferred. For example, after finding that the backup file exists in the file server 44, the policy server 43 delivers an indication to the file sending terminal 41 to instruct the file sending terminal 41 to stop transfer of the file to be transferred.

Figure 6:
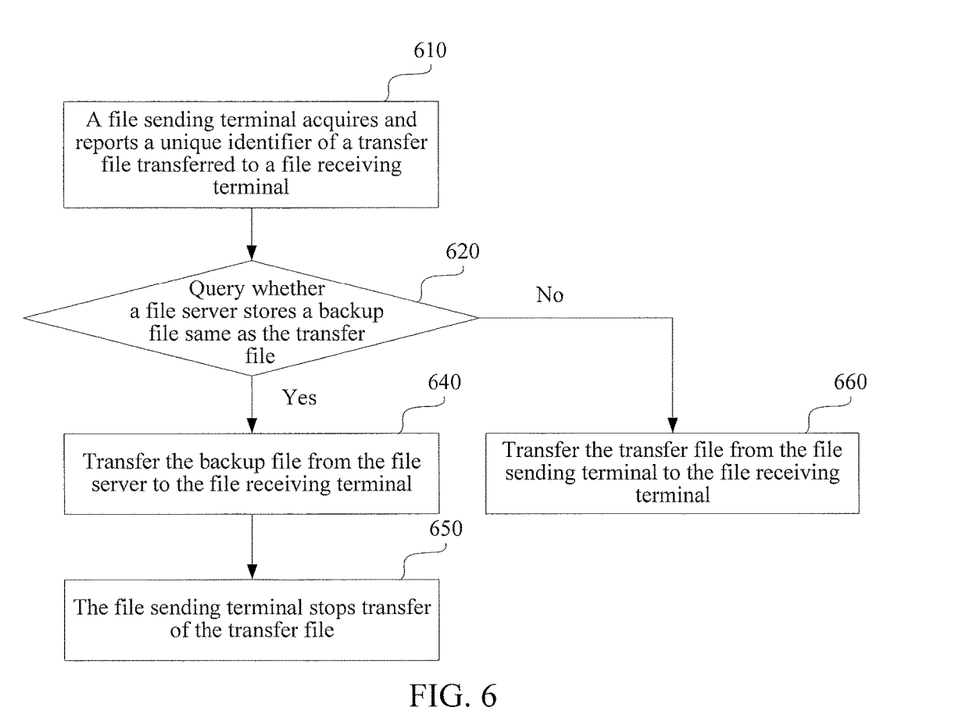
FIG. 6 is a flowchart of another preferred implementation manner according to another embodiment of the present application.

FIG. 6 is a flowchart of another preferred implementation manner according to another embodiment of the present application. As shown in FIG. 6, the process includes:

Step 610: A file sending terminal 41 acquires and reports a unique identifier of a file to be transferred to a file receiving terminal 42.

Step 620: A policy server 63 queries, according to the unique identifier, whether a file server 64 stores a backup file same as the file to be transferred, and performs step 630 if the backup file exists, or performs step 650 if the backup file does not exist.

Step 630: The policy server 43 indicates transfer of the backup file from the file server 44 to the file receiving terminal 42 when the file server 44 stores the backup file.

Step 640: The file sending terminal 41 stops transfer of the file to be transferred.

Step 650: The file to be transferred is transferred from the file sending terminal 41 to the file receiving terminal 42 when the file server 44 does not store the backup file.

In the preferred implementation manner, a policy server provides a file receiving terminal with a location of a backup file; and the file receiving terminal notifies a file sending terminal over a network connection established to the file sending terminal, so that the file sending terminal can stop file transfer in time after the file receiving terminal starts a quick transfer mode, and system resources and network resources of the file sending terminal are saved.

An embodiment of the present application further provides a storage medium, including a computer executable instruction, the computer executable instruction being used for, when executed by a computer processor, executing a file transfer method, and the method including:

acquiring and reporting, by a file sending terminal, a unique identifier of a file to be transferred to a file receiving terminal;

querying, by a policy server according to the unique identifier, whether a file server stores a backup file same as the file to be transferred; and indicating, by the policy server, transfer of the backup file from the file server to the file receiving terminal when the file server stores the backup file.

Based on the foregoing descriptions about the embodiments, a person skilled in the art may clearly understand that the present application may be implemented by using a manner of software in addition to necessary universal hardware, and certainly may also be implemented by hardware. However, software program implementation is a better implementation manner in most cases. Based on such an understanding, the technical solutions of the present application essentially or the part contributing to the existing technology may be implemented in a form of a software product. The computer software product may be stored in a computer readable storage medium such as a floppy disk of a computer, a read-only memory (ROM), a random access memory (RAM), a flash, a magnetic disk, an optical disc or the like, and includes several instructions for instructing a computer device (which may be a personal computer, a server, a network device or the like) to perform the methods described in the embodiments of the present application.

The foregoing descriptions are merely preferred embodiments of the present application, but are not intended to limit the present application. For a person skilled in the art, various modifications and variations can be made on the present application. Any modification, equivalent replacement or improvement made within the spirit and principle of the present application shall fall within the protection scope of the present application.

What is claimed is:
1. A file transfer system including a file sending terminal, a file receiving terminal, a policy server, and a file server, the file transfer system comprising:
a plurality of processors; and memory storing one or more programs to be executed by the plurality of processors, the one or more programs comprising instructions for:
  establishing a connection between the file sending terminal and the file receiving terminal;
  commencing a file transfer process from the file sending terminal to the file receiving terminal using the connection;
  during the file transfer process:
    acquiring, by the file sending terminal, a unique identifier of the file;
    calculating, by the file sending terminal, a transfer state of the file including a steady speed of file transfer and an estimated file transfer time;
    reporting, by the file sending terminal, the unique identifier and the transfer state to the policy server;
    querying, by the policy server according to the unique identifier, whether the file server stores a backup file same as the file being transferred;
    in response to a determination by the policy server that (i) the file server stores the backup file and (ii) the transfer state is worse than a predetermined condition:
      indicating, by the policy server to the file receiving terminal, transfer of the backup file from the file server to the file receiving terminal, including:
        acquiring location information of the backup file; and
        delivering the location information to the file receiving terminal;
      after the location information of the backup file is received by the file receiving terminal:
        instructing, by the file receiving terminal to the file sending terminal, to terminate the file transfer process; and
        downloading, by the file receiving terminal, the backup file from the file server according to the location information.

2. The file transfer system according to claim 1, wherein the unique identifier is obtained through calculation by the file sending terminal according to the file to be transferred.

3. The file transfer system according to claim 1, wherein: the one or more programs include instructions for: calculating, by the file sending terminal, the steady speed of file transfer at a predetermined time after commencing the file transfer process.

4. A policy server, comprising:
one or more processors; and
memory storing one or more programs to be executed by the plurality of processors, the one or more programs including instructions for:
  receiving a unique identifier and a transfer state including a steady speed of file transfer and an estimated file transfer time, reported by a file sending terminal, of a file to be transferred to a file receiving terminal;
  querying, according to the unique identifier, whether a file server stores a backup file same as the file to be transferred; and
  in response to a determination that (i) the file server stores the backup file and (ii) the transfer state is worse than a predetermined condition:
    indicating transfer of the backup file from the file server to the file receiving terminal, including:
      acquiring location information of the backup file; and
      delivering the location information to the file receiving terminal.

5. The policy server according to claim 4, wherein the unique identifier is obtained through calculation by the file sending terminal according to the file to be transferred.

6. The policy server according to claim 4, wherein:
the one or more programs including instructions for: receiving from the file sending terminal the steady speed of file transfer at a predetermined time after commencing the file transfer process.

7. The policy server according to claim 4, the one or more programs including instructions for:
  acquiring location information of the backup file; and
  delivering the location information to the file receiving terminal, so as to instruct the file receiving terminal to download the backup file from the file server.

8. A file transfer method performed by a file transfer system, the file transfer system including a file sending terminal, a file receiving terminal, a policy server, and a file server, the method comprising:
  establishing a connection between the file sending terminal and the file receiving terminal;
  commencing a file transfer process from the file sending terminal to the file receiving terminal using the connection;
  during the file transfer process:
    acquiring, by the file sending terminal, a unique identifier of the file;
    calculating, by the file sending terminal, a transfer state of the file;
    reporting, by the file sending terminal, the unique identifier and the transfer state to the policy server;
    querying, by the policy server according to the unique identifier, whether the file server stores a backup file same as the file to be transferred;
    in response to a determination by the policy server that (i) the file server stores the backup file and (ii) the transfer state is worse than a predetermined condition:
      indicating, by the policy server to the file receiving terminal, transfer of the backup file from the file server to the file receiving terminal, including:
        acquiring location information of the backup file; and
        delivering the location information to the file receiving terminal;
      downloading, by the file receiving terminal, the backup file from the file server according to the location information; and
      instructing by the file receiving terminal to the file sending terminal to stop the file transfer process after the location information of the backup file is received by the file receiving terminal.

9. The file transfer method according to claim 8, wherein the unique identifier is obtained through calculation by the file sending terminal according to the file to be transferred.

10. The file transfer method according to claim 8, wherein:
the steady speed of file transfer is calculated by the file sending terminal at a predetermined time after commencing the file transfer process.

11. The file transfer method according to claim 8, further comprising:
  stopping, by the file sending terminal, transfer of the file to be transferred after the policy server indicates transfer of the backup file from the file server to the file receiving terminal.

* * * * *